March 19, 1946. R. H. ANDRESEN 2,396,631
LATHE ATTACHMENT
Filed Feb. 5, 1945 3 Sheets-Sheet 1

Inventor
Raymond H. Andresen
by The Firm of Charles H. Wills Attys

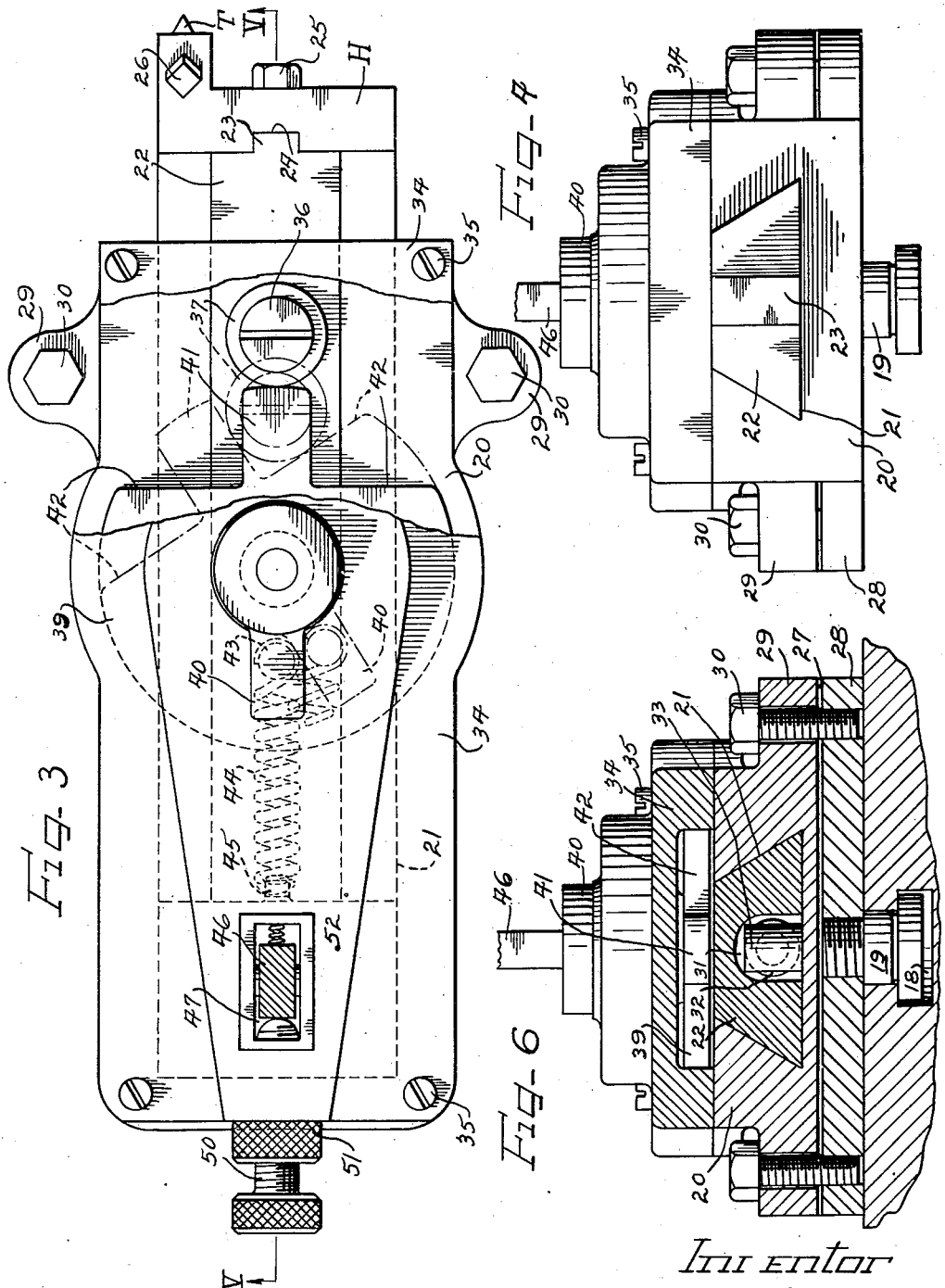

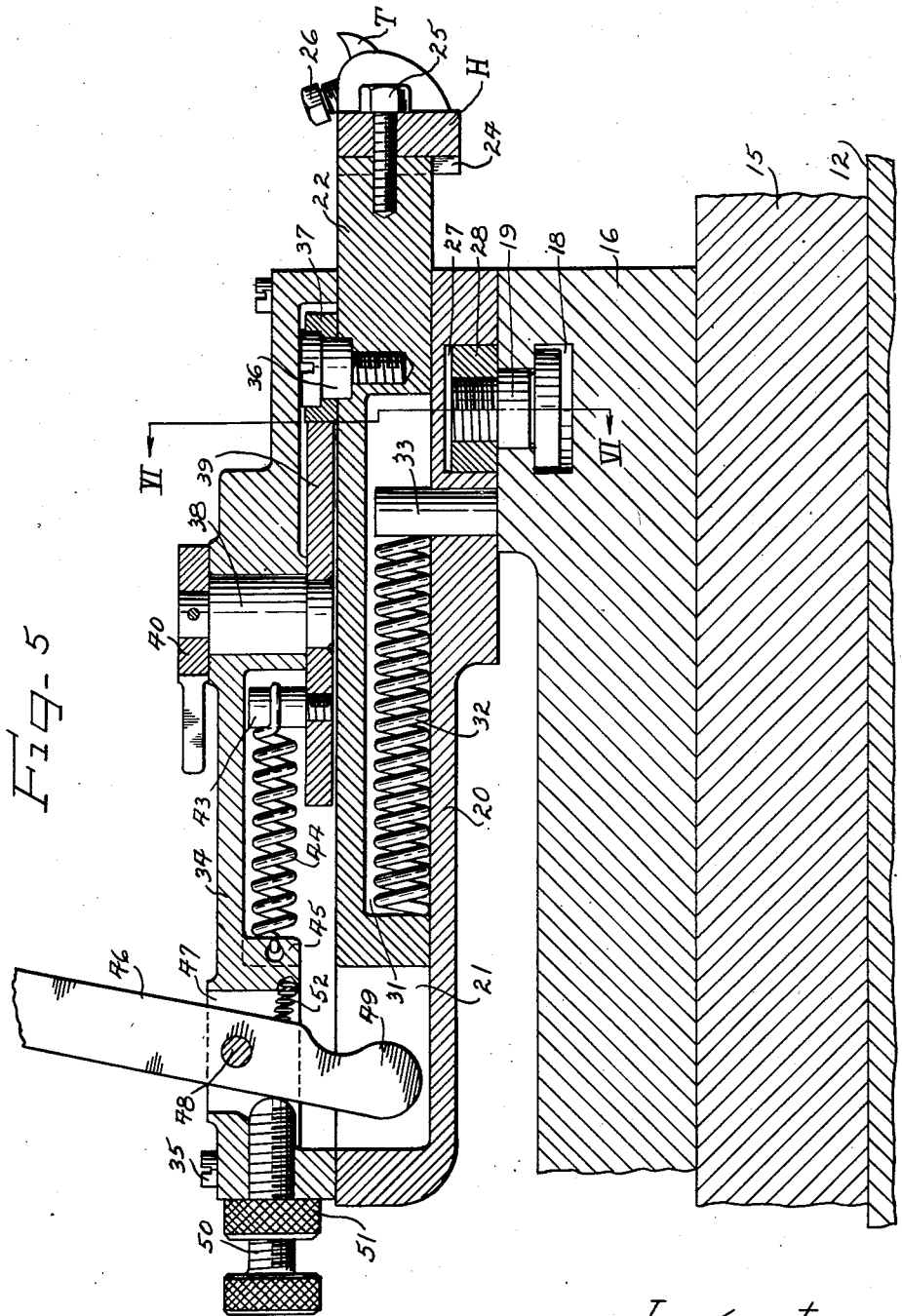

Patented Mar. 19, 1946

2,396,631

UNITED STATES PATENT OFFICE 2,396,631

LATHE ATTACHMENT

Raymond H. Andresen, Chicago, Ill., assignor to Peerless Tool and Engineering Company, Chicago, Ill., a corporation of Illinois Application February 5, 1945, Serial No. 576,215

7 Claims. (Cl. 10—101)

This invention relates to an improved lathe attachment adapted particularly for the cutting of threads on work in the lathe.

An important object of the invention is to provide improved means and operation for retracting a tool from the work at the termination of a thread cut in order that the run-out on a thread may be reproduced accurately to do away with tool breakage when the cutting or chasing of the threading is at a high speed.

Another object of the invention is to provide an attachment by which either right- or left-hand thread cutting and external or internal thread cutting may be accomplished without turning the tool upside down.

A further object of the invention is to provide an attachment which may be substituted for the ordinary tool holder post of a lathe and in which a tool is mounted on and carried by a slide bar, together with means for automatically shifting the bar for withdrawal of the tool from the work at a predetermined point in the operation of the tool.

Another object is to provide a slide bar in my improved attachment to which different types of holders may be attached for supporting various types of tools, and to adapt the attachment for swinging around in a horizontal plane relative to the cross slide on the lathe carriage so that the tool may be positioned at opposite sides of the lathe center for cutting left- or right-hand threading or inside or outside threading without requiring that the tool point be turned upside down.

Another object is to provide an attachment in which the tool holder supporting bar is prevented from abruptly effecting retraction of the tool point from the work but will cause such retraction to be gradual in order to do away with tool breakage when cutting or chasing threads at a high speed.

The above and other features of my invention are embodied in the structures shown on the drawings, in which:

Figure 3 is an enlarged plan view of the attachment;

Figure 4 is an end view of the attachment;

Figure 5 is a section on plane V—V of Figure 3; and

Figure 6 is a section on plane VI—VI of Figure 5.

Figure 1:
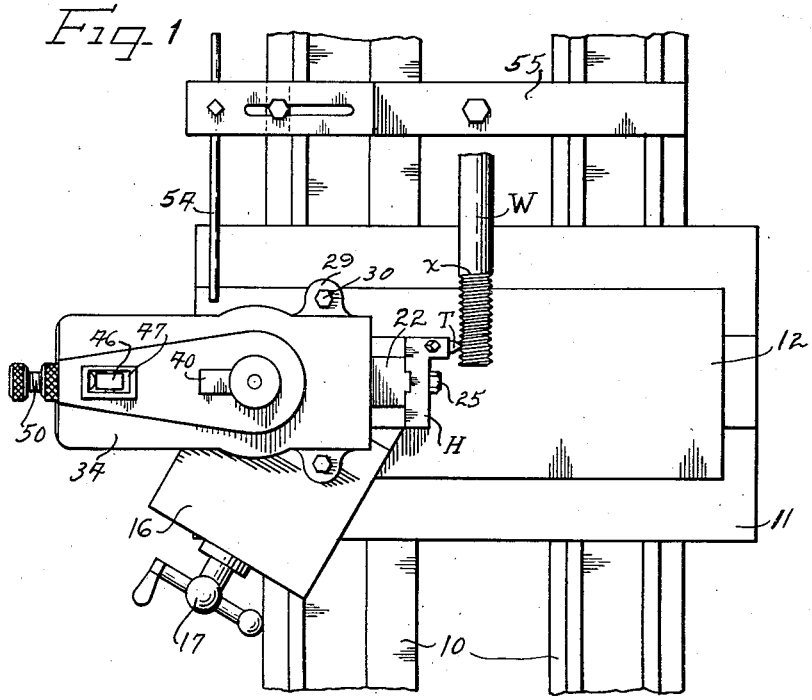
Figure 1 is a plan view of a portion of a lathe bed with the carriage, cross slide, and the compound tool slide, showing my improved attachment substituted for the ordinary tool post and with the setting for cutting of a thread on a piece of work.
Figure 2:
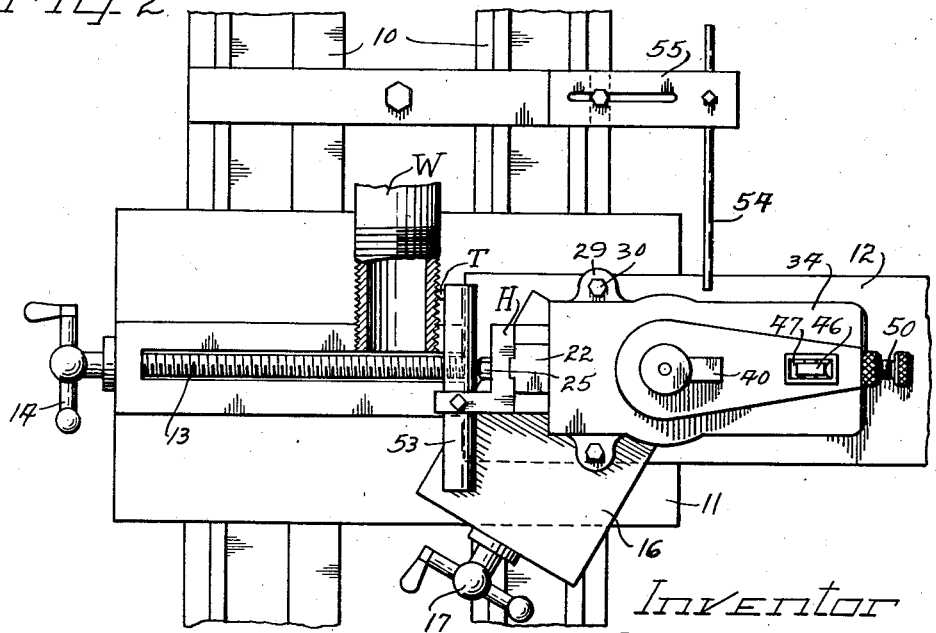
Figure 2 is a similar view showing the cross slide set and my attachment swung around 180 degrees to be at the opposite side of the lathe center for cutting of left-hand threads or for cutting inside or outside threads on a piece of work.

Referring to Figures 1 and 2, 10 indicates the two guide rails of a lathe on which is mounted a lathe carriage 11 on which the cross slide 12 is mounted for setting on the carriage by means of a screw 13 operated by a hand lever 14. The base 16 (Figure 5) of the tool support compound is adjustably mounted on the cross slide 12 and on the base 15. The upper plate 16 is longitudinally adjustable by operation of a hand lever 17. This top plate or tool rest 16 is provided with a cross T-channel 18 for receiving a clamping member 19 by means of which the ordinary tool posts were secured to the rest 16 for adjustment for application of the tool point to the work. My improved attachment was designed to be mounted on the tool rest in place of the ordinary tool posts.

Referring to Figures 3 to 5, my improved attachment comprises an elongated body frame 20 having the dove-tail channel 21 therein for receiving a dove-tail slide bar 22. At its outer end the bar has the vertical tongue 23 thereon for engaging in the channel 24 of tool holders H to be attachably secured to the bar as by a screw 25, the holders being adapted for receiving a tool T to be secured as by a set screw 26.

In the underside of the body 20 at the inner end thereof is a cross channel 27 for receiving a clamping plate 28 to which the clamping member 19 is secured as by threading, the body at its sides having ears 29 for receiving screws 30 for threading in the ends of the plate 28 for drawing the plate up for frictionally locking the clamp member 19 in the channel 18 so as to rigidly hold the body 20 in adjusted position on the compound tool support rest member 16.

In its underside along the outer portion thereof the bar 22 has the channel 31 for receiving a compression spring 32 which is interposed between the end of the channel and a post 33 projecting upwardly from the body 20 into the channel, the spring tending to shift the bar inwardly in the channel 21 i. e., to the left as shown in Fig. 5. Mounted on the body is a cover frame 34 detachably secured to the body as by screws 35. Within the cover are the control means for the bar 22. A stud 36 in the form of a screw extends from the bar 22 into the cover 34 and journals a cam roller 37. A shaft 38 is journaled in the cover and has secured to its inner end a holding member in the form of a cam 39, and has secured to its outer end a lever or trigger 40. The cam 39 is in the form of a flat disk for cooperation with the cam roller 37. The cam disk is cut out to leave the radially extending tongue 41 and the shoulders 42 are opposite thereof shown as extending in chordal direction. From a point diametrically opposite the cam tongue 41 a post 43 extends from the cam disk and a tension spring 44 extends between the post and a lug 45 on the cover 34, this spring tending to hold the cam disk with its cam tongue 41 extending outwardly in the direction of the axis of the bar 22 for engagement by the cam roller 37 on the bar. In this position of the tongue the bar 22 will be held in its outer position against the force of the spring 32 tending to shift the bar inwardly in the body 20. When the lever 40 is swung and the cam disk is rotated, the disk tongue 41 will be swung laterally away from the cam roller so that the spring 32 may then shift the bar 22 inwardly. For manually shifting the bar outwardly for setting of the cam roller in front of the cam tongue, a setting lever 46 is provided. This lever extends through the opening 47 in the cover 34 and is fulcrumed on a pin 48 extending through this opening, the lower end 49 of the lever projecting into the guide channel 21 behind the bar 22. A stop screw 50 threads through the end wall of the cover 34 to form an abutment for the lever 46, a lock nut 51 holding the screw in set position. A spring 52 tends to hold the lever against the stop. When the bar 22 is in its outer position, as shown on Figure 5, the distance between the end 49 of the lever and the end of the bar 22 is such that when the cam disk is rotated for withdrawal of the tongue 41 from behind the cam roller, the inner end of the bar 22 will strike the end of the lever 46 before the cam roller will come into engagement with one of the shoulders 42 of the cam disk, the lever 46 thus taking up the retraction blow of the bar 22 to prevent the cam roller from striking the cam shoulders.

Referring to Figure 1, the attachment has been set on the lathe for cutting by a tool T of threading on a piece of work W shown as a bar, the threading to be cut from the end of the bar to the point X thereon. When this point is reached, the tool should be withdrawn from the work, and this is accomplished by the engagement of the cam lever 40 with a stop member 54. This stop member may be a bar or rod carried by the end of a bracket 55 adjustably secured in any suitable manner to the lathe guide rails. As shown on Figure 1, the bar 54 is set to be engaged by the cam lever 40 when the tool reaches the point X on the work. Such engagement of the cam lever with the bar will result in counter-clockwise rotation of the cam disk, shown on Figure 3, for withdrawal of its tongue 41 from behind the cam roller 37 for release of the bar 22 for inward shift thereof by the spring 32. The spring 44 connected with the cam disk will resist the rotation of the cam by the lever 40 so that when the tongue 41 is withdrawn from the cam roller, the roller will roll down one side of the tongue against the resistance of the spring 44 whereby inward shift of the bar 22 is somewhat retarded, and this will result in gradual withdrawal of the tool from the work rather than abrupt withdrawal so that the end of the thread at the point X will be tapering. After one cut by the tool, the lathe carriage is shifted away from the work and the lever 46 is operated for resetting of the bar 22 in its outer position for re-engagement by the cam tongue, and the cross slide 16 is adjusted for setting of the tool for the next cut, and this continues until the thread has been finally cut. The gradual rather than abrupt withdrawal of the tool from the work at the point X will prevent breakage of the tool when the thread cutting or chasing of the threading is at a high speed.

Referring to Figure 2, the attachment is shown swung around 180 degrees on the cross slide 12 which has been set to bring the tool to the opposite side of the lathe center line. With this setting, and by reversal of the direction of rotation of the work, left-hand threading could be cut on the work without turning the tool point upside down. Figure 2 shows the work W in the form of a tube or cylinder. A tool holder H like that shown on Figure 1 could be mounted on the bar 22 for cutting left-hand threads on the work W, or a tool holder could be attached to the bar 22 for holding a supporting bar 53 for a tool T for cutting external threading on a tubular piece of work or for projection into the tubular work for cutting internal threading thereon. The stop bar 54 will then be set on its supporting bracket 55 for engagement by the cam lever or trigger 40 of the attachment for retraction of the tool from the work at the desired point. With the attachment setting shown on Figure 2, and with the work rotating in the proper direction, left-hand external or right-hand internal threading could be cut on the work. If the attachment were swung around to the position shown on Figure 1 and with the attachment supporting a bar tool 53, external or internal threading could be cut on work. Thus, either right- or left-hand external or internal threading could be cut on work without turning the tool points upside down, and adjustments for the desired cutting can readily and accurately be made. Tool holders for various types of tool bits or bars may be readily attached to the bar 22 of the attachment. The attachment may be applied to and used on any of the usual types of lathes without altering the lathes in any way. My improved attachment is merely substituted for the ordinary tool supporting post and the stop bracket for operating the attachment is applied to the lathe bed or guide rails.

I have shown a practical and efficient embodiment of the features of my invention but I do not desire to be limited to the exact construction, arrangement or operation shown and described as changes and modifications may be made without departing from the scope of the invention as defined in the appended claims.

I claim as my invention:

1. A tool controlling attachment for a lathe comprising a frame adapted to be clamped to the tool slide of the lathe in place of the ordinary tool post, a tool supporting bar shiftable in and with respect to said frame for application of a tool thereon to work in the lathe or for retraction of the tool from the work, spring means tending to shift said bar with respect to said frame for retraction of the tool from the work, releasable holding means for holding said bar for engagement of the tool with the work, and means on the lathe body engageable with said holding means for release thereof when said tool has reached a predetermined point in its operation on the work to enable said spring means to retract said bar into the frame.

2. A tool controlling attachment for lathes comprising a frame adapted to be supported on the tool slide of the lathe in place of the ordinary tool post thereon, a tool supporting bar shiftable longitudinally in said frame for application of a tool to work in the lathe or for retraction of the tool from the work, spring means tending to shift said bar with respect to the frame for retraction of the tool from the work, an abutment on said bar, a holding member in said frame rotatable on a vertical axis, a spring for said holding member tending to hold it in position behind said abutment for holding said bar out with the tool thereon applied to the work, a lever outside of said frame connected with said holding member, stationary means in the path of said lever for engagement thereby for rotating said holding member away from said abutment when the tool has reached a predetermined point in its operation on the work whereby said spring means may shift the bar for retraction of the tool from the work.

3. A tool post structure for mounting on the tool post slide of a lathe, comprising an elongated frame, a tool supporting bar shiftable outwardly in said frame for application of a tool to work in the lathe and shiftable inwardly with respect to the frame for retraction of the tool from the work, a spring in said frame operable to shift said bar inwardly, a releasable holding connection within said frame and acting directly against the bar for holding said bar in its outer position against the force of said spring, means on the outside of said frame operable at a predetermined point in the operation of the tool on the work for releasing said holding connection for inward shift of the bar by said spring for retraction of the tool from the work, and a stop on the lathe engageable with said releasing means at said predetermined point for actuating said releasing means.

4. In a lathe in which a tool post slide is mounted on a cross slide movable with the carriage of the lathe, a tool controlling attachment adjustably mounted on the tool post slide and comprising a frame, a tool supporting bar shiftable outwardly or inwardly in said frame for application of a tool thereon to work in the lathe or for retraction of the tool from the work, a spring in said frame tending to shift said bar inwardly, a lever on said frame for shifting said bar outwardly for application of the tool to the work, an abutment on said bar, a holding cam in said frame and a spring therefor for holding it behind said abutment for holding said bar in its outer position, a trigger outside of said frame connected with said cam, and a stationary stop member on the lathe body engageable by said trigger at a predetermined point in the operation of the tool on the work for moving said cam relative to said abutment for release of said bar for inward movement by its spring for withdrawal of the tool from the work.

5. In a lathe in which a tool post slide is mounted on a cross slide movable with the carriage of the lathe, a tool controlling attachment adjustably mounted on the tool post slide and comprising a frame, a tool supporting bar shiftable outwardly or inwardly in said frame for application of a tool thereon to work in the lathe or for retraction of the tool from the work, a spring in said frame tending to shift said bar inwardly, a lever on said frame for shifting said bar outwardly for application of the tool to the work, an abutment on said bar, a holding cam in said frame and a spring therefor for holding it behind said abutment for holding said bar in its outer position, a trigger outside of said frame connected with said cam, and a stationary stop member on the lathe body engageable by said trigger at a predetermined point in the operation of the tool on the work for moving said cam relative to said abutment for release of said bar for inward movement by its spring for withdrawal of the tool from the work, said cam under the force of its spring functioning to retard the retraction movement of said bar.

6. A thread cutting attachment for lathes comprising a frame adapted to be adjustably mounted on the tool post slide of the lathe in place of the ordinary tool post, a bar shiftable in said frame and adapted at its outer end for mounting thereon of holders for different types of thread cutting tools, means on said frame for shifting said bar outwardly for application of the tool thereon to the work in the lathe on which threading is to be cut, a spring in said frame tending to shift said bar inwardly for retraction of the tool from the work, an abutment on said bar, a holding member in said frame and a spring therefor tending to hold it in position behind said abutment for holding said bar in its outer position for application of the tool to the work, releasing means outside of said frame connected with said holding member, a stationary stop member mounted on the lathe in the path of said releasing means for engagement thereby for movement of said holding member away from said abutment for inward shift of said bar by its spring for retraction of the tool from the work at a predetermined point in the operation of the tool on the work, said holding member being adapted to retard the retraction movement of the bar whereby the tool will be withdrawn gradually from the threading at such predetermined point in its operation.

7. In a lathe in which a tool post slide is mounted on a cross slide movable with the lathe carriage, a unitary tool holding and controlling attachment mounted on the tool post slide in place of the ordinary tool post and including a frame, a tool supporting bar endwise shiftable in said frame for application of the tool thereon to work in the lathe or for retraction of the tool from the work, a spring acting against the inner end of said bar and in the direction of the length of said bar tending to shift said bar inwardly for retraction of the tool, a manually operable lever extending into said frame from the exterior thereof for shifting said bar outwardly for application of the tool to the work, an abutment on said bar, a disk swingably mounted on a vertical axis having a tongue movable to block and unblock said abutment, a tension spring connected to said disk acting normally to urge said tongue to blocking position, a trigger outside of said frame connected to said disk, and a stationary stop member on the lathe engageable by said trigger at a predetermined point in the operation of the tool on the work for moving said disk tongue away from said abutment for releasing said bar for movement of the bar into the frame by said spring to retract the tool from the work.

RAYMOND H. ANDRESEN.